Aug. 25, 1925.
O. C. HANSON
LOCK NUT
Filed Oct. 17, 1922
1,551,389
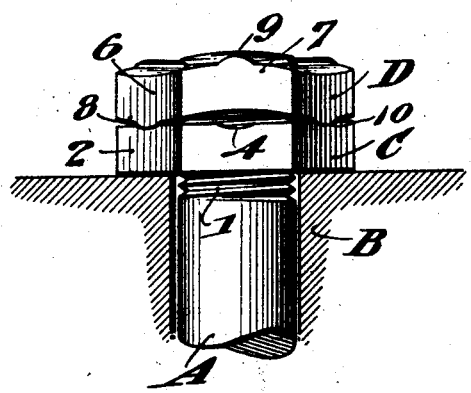
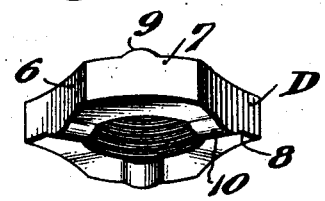
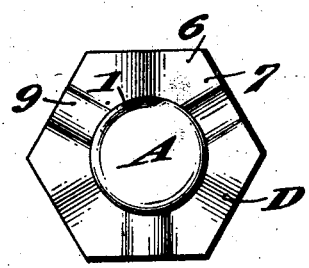
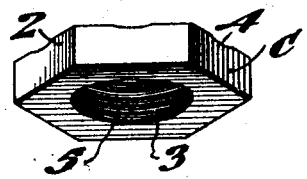
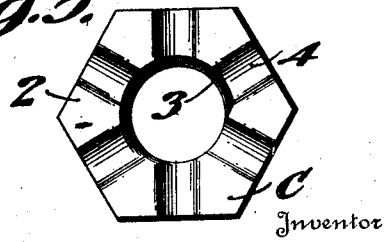
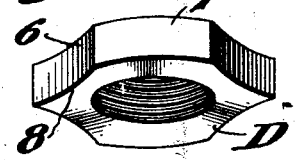
Inventor
O. C. Hanson
By McCracken & Patch
his Attorneys Patented Aug. 25, 1925.

1,551,389

UNITED STATES PATENT OFFICE.

OLOF C. HANSON, OF GALESBURG, ILLINOIS.

LOCK NUT.

Application filed October 17, 1922. Serial No. 595,084.

*To all whom it may concern:*

Be it known that I, OLOF C. HANSON, a citizen of the United States, residing at Galesburg, in the county of Knox and State of Illinois, have invented certain new and useful Improvements in Lock Nuts, of which the following is a specification.

This invention pertains to lock nuts, and particularly to a lock nut structure intended for use upon a bolt or bolt end and constructed to lock against the threads thereof.

An object of my invention is to provide a lock nut structure in which the locking of the parts is accomplished by applying a pair of superposed nut members which jam against each other and frictionally grip the threads of the bolt to thus lock the nuts together and upon the bolt.

A further object lies in so constructing the blanks for the nuts that when they are threaded and the nuts are applied in use the body of one of the nuts will be sprung or flexed to bring the threads thereof into tight gripping relation with the threads of the bolt.

A still further object resides in so constructing the nuts that they can be readily and cheaply manufactured as a commercial article and that they will prove suitable for use in many connections.

With these and other objects in view which will be apparent from the drawing, specification and claims, this invention includes certain novel features of construction and combinations of parts which will now be set forth.

In the drawings:

Figure 1 is a view in elevation of a bolt end showing my invention applied in use.

Fig. 2 is a top plan of the structure in Fig. 1.

Fig. 3 is a perspective view of the outer nut.

Fig. 4 is a view similar to Fig. 3 of the inner nut.

Fig. 5 is a top plan view of the inner nut.

Fig. 6 is a perspective view showing a modified form of the outer nut.

As the parts are illustrated in Fig. 1 the bolt A is passed through a block or other member B, which is to be secured, and the two parts of my improved locking nut are shown at C and D.

The bolt A has its end threaded as at 1, the threads being of any desired gauge and pitch, and in fact the bolt or bolt end is of any standard or desired type, and can be applied or used in any way.

The two parts C and D of the nut are made of relatively thin bodies or blanks which are stamped out from sheet metal or otherwise formed to be of the desired polygonal shape. The blank or body 2 of the part C has the usual central opening 3, and is shaped to provide the grooves 4 extending radially from this central opening. The nut blank is stamped out and formed with its central opening and grooves, and the opening 3 is then threaded as at 5 so that the threads continue through the grooves.

The part D has its blank 6 formed in continuous corrugations so that the edge presents an even waveline, the alternate corrugations being on the upper and lower sides of the body as indicated at 7 and 8. If desired, the radial ribs 9 and 10 can be provided at the crown of the upper and lower corrugations.

In use the bolt end A has the threaded end 1 projecting and the nut member C is turned freely onto the bolt, to a point where it bears against the block or member B or is slightly separated from this portion. The outer nut member D is then turned onto the bolt without resistance up to the point where it comes against the inner member C. As further turning movement is imparted to the outer nut member it bears against the inner nut member, and is sprung sufficiently that it grips the threads of the bolt, the two nut members being held together through their frictional contact. The member D is so constructed that it possesses inherent resiliency and thus will be bowed or flexed through the face contact of the one member with the other. Upon continued turning of the outer member the nut members will be effectively locked together, the flexing of the member D being maintained to bind the threads thereof against the bolt threads 1 and thus lock the nut structure to be coupled with the bolt.

The member D might be stamped or otherwise formed with the ribs omitted on the two faces of the body as shown in Fig. 6, and with these faces plain, and other changes might be made to suit the particular requirements in use.

While in the foregoing I have described specific embodiments, and have mentioned only certain possible modifications, it will be appreciated that in practice I do not limit myself to such specific details as herein set forth, but may resort to any practical modifications falling within the scope of the invention as defined in the appended claims.

I claim:

1. A lock nut including, with a threaded bolt end, an inner nut member grooved radially on its outer side, an outer nut member internally threaded to present at least one complete turn of the thread in contact with the bolt thread, said outer member being corrugated radially from the central opening, said nut members being adapted to be turned separately onto the bolt end and tightened against each other with the grooved side of the inner member adjacent the ribs of the corrugations of the outer member.

2. A lock nut including, with a threaded bolt end, an inner nut member having radial grooves on one side, an outer nut member internally threaded to present at least one complete turn of the thread in contact with the bolt thread, said outer member being corrugated radially and having radial ribs at the crown of the corrugations.

In testimony whereof I affix my signature.

OLOF C. HANSON.